United States Patent
Park et al.

(10) Patent No.: US 9,694,774 B1
(45) Date of Patent: Jul. 4, 2017

(54) BUMPER BEAM UNIT FOR VEHICLES

(71) Applicant: SUNGWOO HITECH CO., LTD., Busan (KR)

(72) Inventors: Joo Il Park, Suwon (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 0 days.

(21) Appl. No.: 15/131,238

(22) Filed: Apr. 18, 2016

(51) Int. Cl.
*B60R 19/18* (2006.01)

(52) U.S. Cl.
CPC ...... *B60R 19/18* (2013.01); *B60R 2019/1806* (2013.01)

(58) Field of Classification Search
CPC .................. B60R 19/18; B60R 2019/1806
USPC .................. 293/102, 122, 146, 148
See application file for complete search history.

(56) References Cited

U.S. PATENT DOCUMENTS

| | | | |
|---|---|---|---|
| 1,485,332 A * | 2/1924 | Edwards | B60R 21/34 280/160 |
| 1,741,513 A * | 12/1929 | Finizio | B60R 19/18 293/107 |
| 1,743,391 A * | 1/1930 | Rahe | B60R 19/12 293/148 |
| 1,746,502 A * | 2/1930 | Sumi | B60R 19/20 293/107 |
| 3,173,717 A * | 3/1965 | Peras | B60R 19/023 293/118 |
| 7,198,309 B2 * | 4/2007 | Reynolds | B60R 19/18 293/120 |

FOREIGN PATENT DOCUMENTS

| | | |
|---|---|---|
| JP | 2010-078062 | 4/2010 |
| JP | 2010078062 A * | 4/2010 |
| KR | 10-2005-0116732 | 12/2005 |
| KR | 10-1270938 | 5/2013 |
| KR | 10-1273020 | 6/2013 |

\* cited by examiner

*Primary Examiner* — Jason S Morrow
*Assistant Examiner* — E Turner Hicks
(74) *Attorney, Agent, or Firm* — Lex IP Meister, PLLC

(57) ABSTRACT

A bumper beam unit for a vehicle is disclosed. A bumper beam unit for a vehicle according to one or a plurality of exemplary embodiments may include a bumper beam of which at least one smaller diameter pipe is inserted into a larger diameter pipe along a length direction thereof, wherein the larger diameter pipe and the smaller diameter pipe are press-formed to have a predetermined length, and a stay that connects both end portions of the bumper beam to a vehicle body.

8 Claims, 6 Drawing Sheets

BUMPER BEAM UNIT FOR VEHICLES

BACKGROUND OF THE INVENTION (a) Field of the Invention

The present invention relates to a bumper beam unit for a vehicle. More particularly, the present invention relates to a bumper beam unit for a vehicle that includes a plurality of space portions in a larger diameter pipe by press-forming a smaller diameter pipe that is inserted into the larger diameter pipe together with the larger diameter pipe.

(b) Description of the Related Art

In general, the bumper in the vehicle is a damping device mounted to predetermined parts of a front and a rear of the vehicle for absorbing a crash impact when the vehicle crashes into another vehicle or a fixed body for promoting occupant safety as well as minimizing vehicle body deformation.

FIG. 1 is an exploded perspective view of a conventional bumper of a vehicle.

Referring to FIG. 1, the bumper 100 is provided with a bumper beam 101 of which sides of a rear part thereof are fixed to sides of vehicle body side members 111 through stays 103, respectively, and that is disposed in a width direction of the vehicle, an energy absorber 107 disposed in front of the bumper beam 101 for absorbing an impact, and a bumper cover 109 for covering the bumper beam 101 and the energy absorber 107.

Because excellent strength and a weight reduction structure are becoming needed through development of production techniques, the bumper beam 101 has evolved from having an opened cross-sectional structure to a closed cross-sectional structure.

The bumper beam 101 of the closed cross-sectional structure has an equal cross-section throughout a length direction thereof due to a production process characteristic, and equal buckling has to be generated when it is impacted in a normal compression direction.

Therefore, a thickness or a cross-sectional shape of the bumper beam 101 has to be controlled so as to enhance crash absorption performance of the bumper beam 101.

However, when the thickness is increased or the cross-sectional shape of the bumper beam 101 is changed, the weight and the production cost of the bumper beam 101 are increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a bumper beam unit for a vehicle having advantages of including a plurality of space portions in a larger diameter pipe by press-forming a smaller diameter pipe that is inserted into the larger diameter pipe together with the larger diameter pipe such that localized strength of a bumper beam is secured and production cost and weight of a bumper beam are reduced without an increment of a thickness and a cross-section of the bumper beam.

A bumper beam unit for a vehicle according to one or a plurality of exemplary embodiments may include a bumper beam of which at least one smaller diameter pipe is inserted into a larger diameter pipe along a length direction thereof, the larger diameter pipe and the smaller diameter pipe being press-formed to have a predetermined length, and a stay that connects both end portions of the bumper beam to a vehicle body.

Further, two smaller diameter bumper beams may be inserted into the larger diameter pipe, they are simultaneously press-formed, and the smaller diameter pipes are fixed at an upper side and a lower side of the larger diameter pipe.

A first forming portion may be formed by press-forming a central portion of the larger diameter pipe along the shape of the two smaller diameter pipes that are disposed at an upper side and a lower side in the larger diameter pipe, a second forming portion may be formed by press-forming both end portions of the larger diameter pipe and the two smaller diameter pipes such that a cross-section of the smaller diameter pipes has an oval shape, and a third forming portion may be formed by press-forming the larger diameter pipe and the two smaller diameter pipes between the first forming portion and the second forming portion such that a width of the smaller diameter pipe becomes narrower from the first forming portion to the second forming portion.

A first space portion and a second space portion that are divided by the two smaller diameter pipes may be formed inside the larger diameter pipe.

The first space portion of the first forming portion may be narrower than that of the second forming portion.

A central portion of a rear side of the larger diameter pipe may be pressed toward a front side by press-forming to form a pressing portion such that the two smaller diameter pipes are divided into an upper side and a lower side.

The bumper beam may have a predetermined curvature along a length direction thereof.

In an exemplary embodiment of the present invention, a plurality of space portions in a larger diameter pipe are formed by press-forming a smaller diameter pipe that is inserted into the larger diameter pipe together with the larger diameter pipe, and there is an effect that localized strength of a bumper beam is secured.

Further, the bumper beam has a structure in which a smaller diameter pipe is inserted into a larger diameter pipe to make it easy to be produced, and it can secure design flexibility.

In addition, the weight of the bumper beam can be minimized and the production cost can be reduced, because it is not necessary to increase a thickness and to change the shape of the bumper beam so as to secure the strength of the bumper beam.

Also, both end portions of the larger diameter pipe and the smaller diameter pipe are combined through a second forming portion and a third forming portion in the bumper beam such that welding is not necessary, and there is an effect that the strength of a joining portion is prevented from being deteriorated.

DETAILED DESCRIPTION OF THE EMBODIMENTS

Hereinafter, an exemplary embodiment of the present invention will be described with reference to accompanying drawings.

Parts that are not related to this invention will be omitted so as to describe an exemplary embodiment of the present invention.

Figure 1:
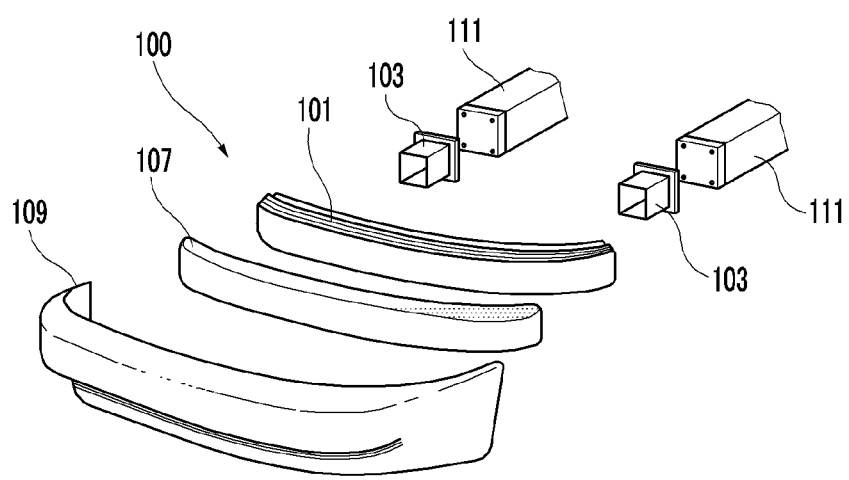
FIG. 1 is an exploded perspective view of a conventional bumper of a vehicle.
Figure 2:
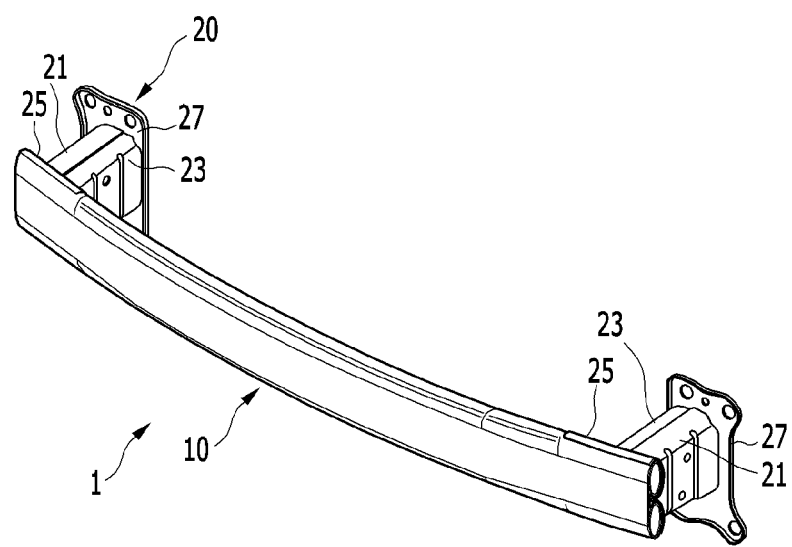
FIG. 2 is an assembly perspective view of a bumper beam unit for a vehicle according to an exemplary embodiment of the present invention.
Figure 3:
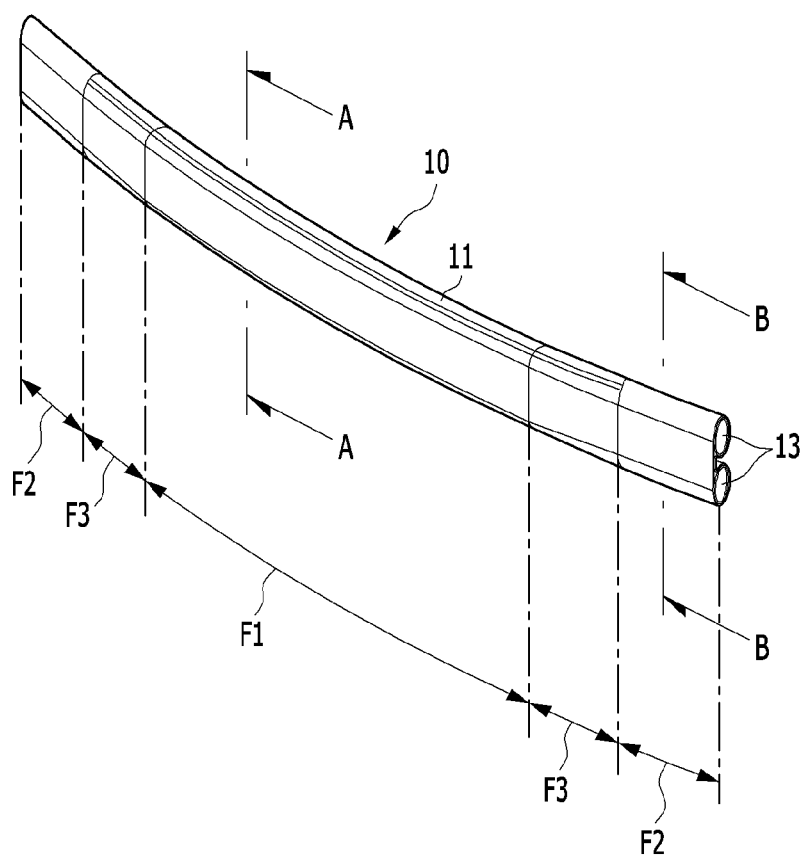
FIG. 3 is a perspective view of a bumper beam of a bumper beam unit for a vehicle according to an exemplary embodiment of the present invention.

FIG. 2 is an assembly perspective view of a bumper beam unit for a vehicle according to an exemplary embodiment of the present invention, and FIG. 3 is a perspective view of a bumper beam of a bumper beam unit for a vehicle according to an exemplary embodiment of the present invention.

Referring to FIG. 2 and FIG. 3, a bumper beam unit 1 for a vehicle according to an exemplary embodiment of the present invention includes a bumper beam 10 and a stay 20.

Here, the bumper beam 10 includes a larger diameter pipe 11 and a smaller diameter pipe 13 having a predetermined length.

In the bumper beam 10, at least one smaller diameter pipe 13 is inserted into the larger diameter pipe 11 along a length direction, and the larger diameter pipe 11 and the smaller diameter pipe 13 are press-formed together.

Further, the stay 20 is welded to both sides of a rear side of the bumper beam 10 through a front flange 25.

That is, front and rear flanges 25 and 27 are disposed at a front and a rear of the stay 20, and an outer panel 21 and an inner panel 23 having a """⊏""" shape are welded to each other between the front and rear flanges 25 and 27 to form a box shape.

Two smaller diameter pipes 13 are inserted into the larger diameter pipe 11 in the bumper beam 10, and the larger diameter pipe 11 and the smaller diameter pipes 13 are simultaneously press-formed.

That is, the smaller diameter pipes 13 are fixed at an upper side and a lower side inside the larger diameter pipe 11 on the bumper beam 10 through press-forming.

In addition, first, second, and third forming portions F1, F2, and F3 are formed on the bumper beam 10.

The first forming portion F1 is press-formed along the outer shape of the two smaller diameter pipes 13 that are disposed at an upper side and a lower side inside the larger diameter pipe 11 at a central portion of a length direction of the bumper beam 10.

The second forming portion F2 is formed by press-forming both end portions of the larger diameter pipe 11 and the two smaller diameter pipes 13 of the bumper beam 10 such that the smaller diameter pipes 13 have an oval shape.

The third forming portion F3 is formed by press-forming the larger diameter pipe 11 and the two smaller diameter pipes 13 together between the first forming portion F1 and the second forming portion F2 such that the smaller diameter pipe 13 has an oval shape from the first forming portion to the second forming portion.

Here, the larger diameter pipe 11 and the smaller diameter pipe 13 are press-formed to have an oval shape at both ends of the bumper beam 10 through the second and third forming portions F2 and F3, and the larger diameter pipe 11 and smaller diameter pipe 13 can be combined with each other without a separate welding process.

Figure 4:
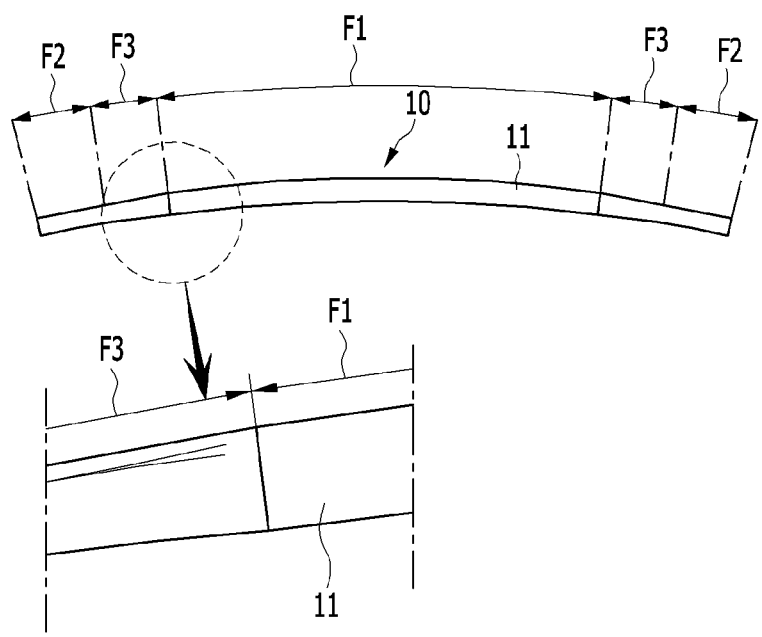
FIG. 4 is a top plan view of a bumper beam of a bumper beam unit for a vehicle according to an exemplary embodiment of the present invention.
Figure 5:
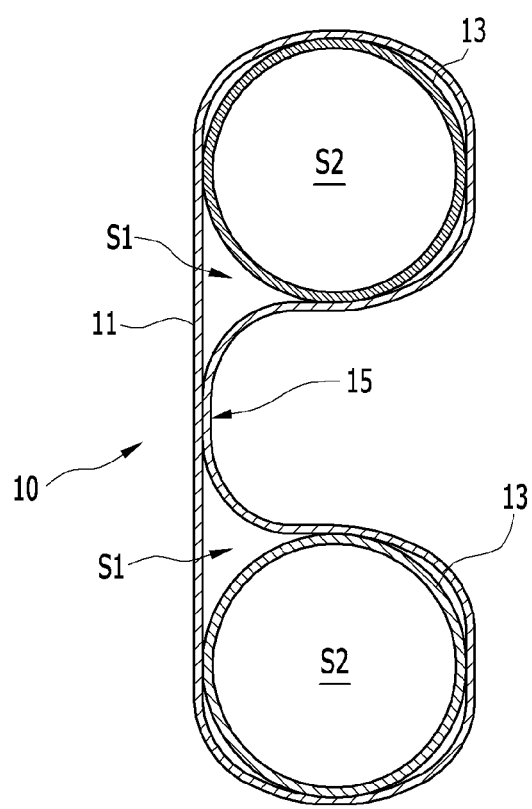
FIG. 5 is a cross-sectional view along line A-A of FIG. 3.
Figure 6:
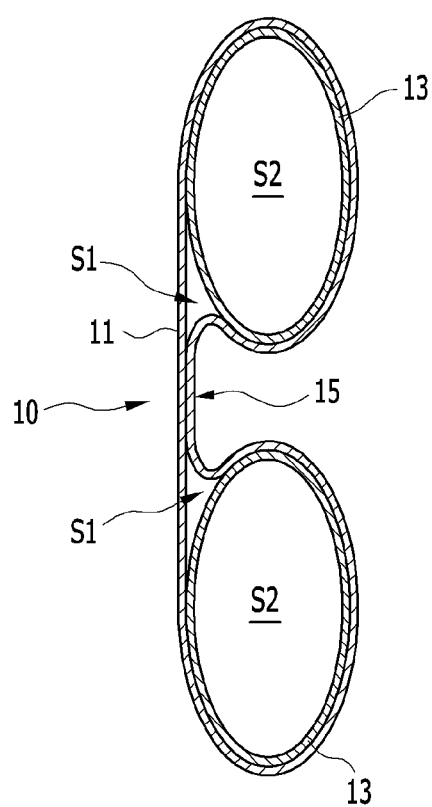
FIG. 6 is a cross-sectional view along line B-B of FIG. 3.

FIG. 4 is a top plan view of a bumper beam of a bumper beam unit for a vehicle according to an exemplary embodiment of the present invention, FIG. 5 is a cross-sectional view along line A-A of FIG. 3, and FIG. 6 is a cross-sectional view along line B-B of FIG. 3.

Referring to FIG. 4 to FIG. 6, first and second space portions S1 and S2 are formed inside the larger diameter pipe 11, and they are divided by the two smaller diameter pipes 13.

Here, a rear center portion of the larger diameter pipe 11 is pressed toward a front side by press-forming to form a pressing portion 15 to divide the two smaller diameter pipes 13 into an upper side and a lower side.

The first space portion S1 of the second forming portion F2 is narrower than that of the first forming portion F1.

The second space portion S2 has a circular shape in the first forming portion F1 and has an oval shape in the third forming portion F3.

The bumper beam 10 is bending-formed to have a predetermined curvature along a length direction corresponding to a curved line of a front and a rear of a vehicle.

As described above, in a bumper beam unit 1 for a vehicle according to an exemplary embodiment of the present invention, the smaller diameter pipes 13 and the larger diameter pipe 11 are press-formed together, and localized strength of the bumper beam 10 can be secured through the first and second space portions S1 and S2 that are divided by the smaller diameter pipes 13 inside the larger diameter pipe 11.

The bumper beam 10 has a structure in which the smaller diameter pipes 13 are inserted into the larger diameter pipe 11 such that a production process becomes easy and design flexibility can be secured.

Further, it is not necessary to increase a thickness or to change a cross-sectional shape of the bumper beam 10 so as to secure strength of the bumper beam 10, and thus the weight thereof can be minimized and the production cost can be saved.

In addition, the larger diameter pipe 11 and the smaller diameter pipe 13 of both ends of the bumper beam 10 are combined through the second and third forming portions F2 and F3, and thus separate welding is not necessary to be able to prevent the joining portion from being deteriorated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: bumper beam unit
10: bumper beam
11: larger diameter pipe
13: smaller diameter pipe
15: pressing portion
20: stay
21: outer panel
23: inner panel
25: front flange
27: rear flange
F1: first forming portion
F2: second forming portion
F3: third forming portion
S1: first space portion
S2: second space portion

What is claimed is:

1. A bumper beam unit for a vehicle, comprising;
a bumper beam of which at least one smaller diameter pipe is inserted into a larger diameter pipe along a length direction thereof, and the larger diameter pipe and the smaller diameter pipe are press-formed to have a predetermined length; and
a stay that connects both end portions of the bumper beam to a vehicle body,
wherein:
a first forming portion is formed by press-forming a central portion of the larger diameter pipe along the shape of the two smaller diameter pipes that are disposed at an upper side and a lower side in the larger diameter pipe;
a second forming portion is formed by press-forming both end portions of the larger diameter pipe and the two smaller diameter pipes such that the cross-section of the smaller diameter pipes has an oval shape; and
a third forming portion is formed by press-forming the larger diameter pipe and the two smaller diameter pipes between the first forming portion and the second forming portion such that a width of the smaller diameter pipes becomes narrower from the first forming portion to the second forming portion.

2. The bumper beam unit of claim 1, wherein two smaller diameter pipes are inserted into the larger diameter pipe, they are simultaneously press-formed, and the smaller diameter pipes are fixed at an upper side and a lower side of the larger diameter pipe.

3. The bumper beam unit of claim 1, wherein a first space portion and a second space portion that are divided by the two smaller diameter pipes are formed inside the larger diameter pipe.

4. The bumper beam unit of claim 3, wherein a cross-sectional area of the first space portion at the first forming portion is narrower than a cross-sectional area of the first space portion at the second forming portion.

5. The bumper beam unit of claim 1, wherein a central portion of a rear side of the larger diameter pipe is pressed toward a front side by press-forming to form a pressing portion such that the two smaller diameter pipes are divided into an upper side and a lower side.

6. The bumper beam unit of claim 1, wherein the bumper beam has a predetermined curvature along a length direction thereof.

7. The bumper beam unit of claim 2, wherein the bumper beam has a predetermined curvature along a length direction thereof.

8. The bumper beam unit of claim 2, wherein:
a first forming portion is formed by press-forming a central portion of the larger diameter pipe along the shape of the two smaller diameter pipes that are disposed at an upper side and a lower side in the larger diameter pipe;
a second forming portion is formed by press-forming both end portions of the larger diameter pipe and the two smaller diameter pipes such that the cross-section of the smaller diameter pipes has an oval shape; and
a third forming portion is formed by press-forming the larger diameter pipe and the two smaller diameter pipes between the first forming portion and the second forming portion such that a width of the smaller diameter pipes becomes narrower from the first forming portion to the second forming portion.

* * * * *